(12) United States Patent
Kitamura

(10) Patent No.: US 7,342,321 B2
(45) Date of Patent: Mar. 11, 2008

(54) BICYCLE ELECTRIC POWER UNIT

(75) Inventor: Satoshi Kitamura, Sakai (JP)

(73) Assignee: Shimano Inc., Osaka (JP)

( * ) Notice: Subject to any disclaimer, the term of this patent is extended or adjusted under 35 U.S.C. 154(b) by 67 days.

(21) Appl. No.: 11/300,411

(22) Filed: Dec. 15, 2005

(65) Prior Publication Data

US 2006/0226879 A1 Oct. 12, 2006

(30) Foreign Application Priority Data

Mar. 16, 2005 (JP) .............................. 2005-074627

(51) Int. Cl.
*B62J 6/00* (2006.01)
(52) U.S. Cl. ...................................................... 290/1 R
(58) Field of Classification Search ................. 290/1 R
See application file for complete search history.

(56) References Cited

U.S. PATENT DOCUMENTS

| | | | | |
|---|---|---|---|---|
| 4,105,878 A | * | 8/1978 | Date et al. ..................... | 218/10 |
| 4,204,191 A | * | 5/1980 | Daniels ........................ | 340/432 |
| 4,268,787 A | * | 5/1981 | Sloan ............................ | 322/8 |
| 4,751,398 A | * | 6/1988 | Ertz, III ....................... | 307/66 |
| 4,760,372 A | * | 7/1988 | Watson ........................ | 340/432 |
| 4,820,965 A | * | 4/1989 | Siemer ........................ | 320/165 |
| 5,072,209 A | * | 12/1991 | Hori et al. ................... | 340/432 |
| 5,142,203 A | * | 8/1992 | Oda et al. .................... | 315/308 |
| 5,569,550 A | * | 10/1996 | Garrett et al. .................. | 429/7 |
| 5,642,100 A | * | 6/1997 | Farmer ................... | 340/636.13 |
| 5,652,501 A | * | 7/1997 | McClure et al. ....... | 340/636.15 |
| 5,710,911 A | * | 1/1998 | Walsh et al. ................. | 713/500 |
| 5,727,221 A | * | 3/1998 | Walsh et al. ................. | 713/310 |
| 5,734,919 A | * | 3/1998 | Walsh et al. ................. | 713/300 |
| 5,754,436 A | * | 5/1998 | Walsh et al. ................. | 713/300 |
| 5,754,837 A | * | 5/1998 | Walsh et al. ................. | 713/300 |
| 5,771,373 A | * | 6/1998 | Kau et al. ..................... | 713/500 |
| 5,781,780 A | * | 7/1998 | Walsh et al. ................. | 713/300 |
| 5,784,291 A | * | 7/1998 | Chen et al. .................... | 716/10 |
| 5,799,281 A | * | 8/1998 | Login et al. .................... | 705/1 |
| 5,842,005 A | * | 11/1998 | Walsh et al. ................. | 713/500 |
| 5,864,702 A | * | 1/1999 | Walsh et al. ................. | 713/320 |
| 5,870,617 A | * | 2/1999 | Walsh et al. ................. | 713/324 |

(Continued)

FOREIGN PATENT DOCUMENTS

DE 199 48 798 A1 5/2001

(Continued)

*Primary Examiner*—Darren E. Schuberg
*Assistant Examiner*—Pedro J. Cuevas
(74) *Attorney, Agent, or Firm*—Global IP Counselors, LLP

(57) ABSTRACT

A bicycle electric power unit supplies electric power to a bicycle motor unit having a power source, a power source controller, a power source voltage detector, a first power source switch and a second power source switch. The power source controller turns off the first power source switch when the power source voltage detector detects a voltage of a specific value or less. The first power source switch supplies electric power to the power source controller when the power source is on and blocks the electric power to the power source controller when the power source is off. The first power source switch is turned off by the power source controller when the power source is on. The second power source switch is disposed between the power source and the motor unit. The second power source is turned on and off by the power source controller.

20 Claims, 5 Drawing Sheets

U.S. PATENT DOCUMENTS

| | | | |
|---|---|---|---|
| 5,872,983 A * | 2/1999 | Walsh et al. | 713/300 |
| 5,933,076 A * | 8/1999 | Babb | 340/475 |
| 5,943,507 A * | 8/1999 | Cornish et al. | 710/48 |
| 5,987,244 A * | 11/1999 | Kau et al. | 713/500 |
| 6,109,770 A * | 8/2000 | Choimet et al. | 362/473 |
| 6,407,469 B1 * | 6/2002 | Cline et al. | 307/11 |
| 6,418,041 B1 * | 7/2002 | Kitamura | 363/125 |
| 6,445,163 B1 * | 9/2002 | Chenier et al. | 320/133 |
| 6,633,472 B2 * | 10/2003 | Lai | 361/93.1 |
| 6,639,389 B2 * | 10/2003 | Binder et al. | 323/266 |
| 6,643,108 B2 * | 11/2003 | Cline et al. | 361/42 |
| 6,747,367 B2 * | 6/2004 | Cline et al. | 307/11 |
| 6,794,836 B2 * | 9/2004 | Strothmann et al. | 318/268 |
| 6,828,755 B1 * | 12/2004 | Iverson et al. | 320/104 |
| 6,853,155 B2 * | 2/2005 | Yamamoto et al. | 315/291 |
| 7,045,910 B2 * | 5/2006 | Kitamura et al. | 290/1 C |
| 7,049,932 B2 * | 5/2006 | French et al. | 340/7.1 |
| 7,069,161 B2 * | 6/2006 | Gristina et al. | 702/61 |
| 7,145,256 B2 * | 12/2006 | Koharcheck et al. | 290/1 R |
| 7,205,746 B2 * | 4/2007 | Batson | 320/107 |
| 7,218,214 B2 * | 5/2007 | Werner et al. | 340/468 |
| 7,243,937 B2 * | 7/2007 | Ishikawa | 280/288.4 |
| 7,267,352 B2 * | 9/2007 | Ishikawa | 280/288.4 |
| 7,282,872 B2 * | 10/2007 | Ohta et al. | 315/308 |
| 7,304,402 B2 * | 12/2007 | Osawa et al. | 307/10.1 |
| 2002/0070611 A1 * | 6/2002 | Cline et al. | 307/149 |
| 2002/0089236 A1 * | 7/2002 | Cline et al. | 307/149 |
| 2003/0048587 A1 * | 3/2003 | Lai | 361/42 |
| 2003/0111972 A1 * | 6/2003 | Strothmann et al. | 318/268 |
| 2003/0168999 A1 * | 9/2003 | Yamamoto et al. | 315/291 |
| 2004/0189091 A1 * | 9/2004 | Algrain et al. | 307/10.1 |
| 2004/0189098 A1 * | 9/2004 | Algrain et al. | 307/80 |
| 2004/0212342 A1 * | 10/2004 | Batson | 320/107 |
| 2005/0007047 A1 * | 1/2005 | Strothmann et al. | 318/268 |
| 2005/0029867 A1 * | 2/2005 | Wood | 307/10.1 |
| 2005/0063123 A1 * | 3/2005 | Cline et al. | 361/104 |
| 2006/0146456 A1 * | 7/2006 | Williams | 361/42 |
| 2007/0080692 A1 * | 4/2007 | Evans | 324/426 |
| 2007/0159143 A1 * | 7/2007 | Yang | 323/247 |
| 2007/0159740 A1 * | 7/2007 | Williams et al. | 361/42 |
| 2007/0164689 A1 * | 7/2007 | Suzuki | 315/291 |
| 2007/0273216 A1 * | 11/2007 | Farbarik | 307/86 |
| 2007/0291620 A1 * | 12/2007 | Yu et al. | 369/116 |

FOREIGN PATENT DOCUMENTS

| | | |
|---|---|---|
| EP | 0 543 453 A1 | 5/1993 |
| EP | 1 398 266 A2 | 3/2004 |
| JP | 08-227731 A | 9/1996 |
| JP | 08-251713 A | 9/1996 |
| JP | 2003-011879 A | 1/2003 |

* cited by examiner

BICYCLE ELECTRIC POWER UNIT

CROSS-REFERENCE TO RELATED APPLICATIONS

This application claims priority under 35 U.S.C. § 119 to Japanese Patent Application No. 2005-074627. The entire disclosure of Japanese Patent Application No. 2005-074627 is hereby incorporated herein by reference.

BACKGROUND OF THE INVENTION

1. Field of the Invention

The present invention generally relates to an electric power unit. More specifically, the present invention relates to a bicycle electric power unit for supplying electric power to electrical components that are capable of being installed on a bicycle.

2. Background Information

Recently, various electrical components other than headlights are being installed on bicycles. For example, electrical components such as power assist motors and control devices for controlling such motors are being installed on bicycles, known as "assist bikes." Also, electrical components such as gear shifting motor units and gear shift control devices are being installed on bicycles having electrically-operated gear shift functions. Primary batteries or secondary batteries are used as power sources for these electrical components. Secondary batteries, capacitors or other such electrical storage elements are used as power sources for storing electricity generated by electric generator bicycle hubs. (See, for example, Japanese Patent Application Laid-Open No. 2003-011879.)

An electric power unit that uses a conventional electrical storage element as a power source has a power conservation circuit. The power conservation circuit uses a microcomputer to block the supply of electric power to electrical components when a control system is not operating while the bicycle is moving. This prevents unnecessary consumption of electric power from the power source. Also, the microcomputer is configured to function in a power conservation mode. In the power conservation mode, less power is consumed when a control operation has not been performed for a specific time. Thus, consumption of the electric power from the power source is reduced by this power conservation mode. In the power conservation mode, when an operating switch is actuated or a speed signal is entered, the system returns to regular control mode if it is determined that the bicycle is not stationary.

Even with such measures for reducing power consumption, a control unit of the power conservation circuit consumes a certain amount of electric power in the power conservation mode. Therefore, the electric power from the power source is consumed even when the control system is inactive and the bicycle is stationary. When the electric power of the power source is consumed even when the control system is inactive, the power source may over discharge. Thus, the functionality of the power source is reduced. When a secondary battery is used as the power source, the functionality of the secondary battery is particularly likely to be severely reduced due to an over discharge.

A known example of techniques for preventing such over discharge includes a technique of making multiple comparisons, including a comparison between an average value of the power source voltage over a specific period of time and a threshold value. The supply of electric power to the motor is halted when results of any of the multiple comparisons exceeds the threshold value. (See, for example, Japanese Patent Application Laid-Open No. 8-251713.) In this conventional technique, the secondary battery, composed of a plurality of individual batteries, is used as the power source. The supply of electric current to a motor is stopped when at least one value selected from the group consisting of the average value of the secondary battery over a specific time, an instantaneous voltage of the secondary battery and the instantaneous voltage of the individual batteries reaches a specific threshold value. The supply of electric current to the motor is also stopped when at least one value selected from the group consisting of the amount of electric current discharged after the secondary battery is charged and the distance the bicycle has traveled after charging of the secondary battery is complete reaches a specific threshold value.

In this conventional technique, information that the discharge has stopped is stored in the nonvolatile memory after the electric current of the motor has stopped. When a rider turns a power source switch on after previously turning off the power source switch to stop the control unit, the control unit is restarted. Pertinent information is then read out and the state of suspended discharge is maintained when the information that discharge has stopped is read out. Thus, a discharge-ready state is enabled at all other times.

Another known example of techniques for preventing such over discharge includes a technique of stopping a discharge of the secondary battery when a remaining capacity of the secondary battery falls below a specific capacity. A measurement of the remaining capacity is stored in nonvolatile memory. (See, for example, Japanese Patent Application Laid-Open No. 8-227731.)

In either of these conventional techniques for preventing over discharge, a plurality of operations is controlled by software in the control unit having a CPU. Therefore, if a state of over discharge is reached and the supply of electric current to the motor is stopped, the state of over discharge continues due to the electric power consumption of the control unit as long as the control unit is operating. Therefore, it might not be possible to effectively prevent deterioration of the power source due to over discharge.

In view of the above, it will be apparent to those skilled in the art from this disclosure that there exists a need for an improved bicycle electric power unit to effectively suppress deterioration of the power source due to over discharge. This invention addresses this need in the art as well as other needs, which will become apparent to those skilled in the art from this disclosure.

SUMMARY OF THE INVENTION

An object of the present invention is to effectively suppress deterioration of the power source due to over discharge in a bicycle electric power unit having a power source and a control unit.

Another object of the present invention is to ensure that the control unit for controlling the power source is restarted with a simple operation when the control unit has stopped.

The bicycle electric power unit pertaining to a first aspect of the present invention is an apparatus that includes a power source, a power source controller, a power source voltage detector and a first power source switch. The power source controller is configured to turn the power source on or off. The power source voltage detector is configured to detect a voltage of the power source. The first power source switch is configured to selectively supply electric power to the power source controller. The first power source is turned off by the power source controller from an on position. The power source controller is configured to turn the first power source switch to off when the power source voltage detector detects a voltage of a predetermined value or less.

In this electric power unit, determining that the power source voltage is at a specific voltage or less causes the power source controller to turn off the first power source switch when electric power is supplied from the power source to the power source controller and when the power source controller is operating in a state in which the first power source switch is on. As a result, the supply of electric power to the power source controller from the first power source switch is blocked, the operation of the power source supply unit stops and electric power is no longer consumed by the power source supply unit. The second power source switch controlled by the power source controller is thereby also turned off. When the power source voltage falls to a specific value or less, electric power is no longer supplied to the power source controller and electric power is therefore no longer consumed by the power source controller operating in power conservation mode. Therefore, deterioration of the power source due to over discharge is effectively prevented.

The bicycle electric power unit relating to a second aspect of the present invention is the apparatus according to the first aspect of the present invention wherein the electrical components function according to the operation of an operating switch capable of being mounted on the bicycle. The first power source switch is connected to the operating switch. The first power source switch is turned on by the turning of the operating switch from off to on. The power source controller turns the second power source switch on when electric power is supplied from the first power source switch.

In this case, the first power source switch is turned on if the operating switch is turned on when the first power source switch is off and the power source controller has stopped. As a result, electric power from the power source is supplied to the power source controller. The power source controller then starts operating and turns the second power source switch on. Since the configuration is designed so that the first power source switch is turned on by the hardware used in the operation of the operating switch, which is an electrical component, electric power is supplied to the power source controller. The second power source switch is turned on to supply electric power to the electrical components merely by turning the often-used operating switch on. Therefore, even if the power source controller is stopped in order to reduce consumption by the power source, the power source controller is restarted and made to supply electric power to the electrical components without providing a special switch for turning the power source on and off. Also, even if the first power source switch is turned off due to erroneous operations or the like while the bicycle is moving, the switch is automatically turned on by turning the operating switch on and electric power can be supplied to the power source controller and the electrical components. Therefore, the control unit for controlling the power source is restarted with a simple operation when the control unit has stopped.

The bicycle electric power unit relating to a third aspect of the present invention is the apparatus according to the first or second aspect further comprising an electric current detector for detecting the electric current value of the electric power supplied to the electrical components, wherein the power source controller controls the first power source switch to turn off when the electric current detector detects an electric current value equal to or greater than a specific value.

In this case, damage to the electric power unit or the electrical components due to an overcurrent is prevented because the power source controller stops when an excessively strong electric current of a specific value or greater, which causes overloading, is supplied to the electrical components in addition to the power source voltage.

The bicycle electric power unit relating to a fourth aspect of the present invention is the apparatus according to the third aspect wherein the electric current detector is included in the power source controller.

In this case, the configuration of the power source detection unit is simplified because the power source voltage detector is included in the power source controller.

The bicycle electric power unit relating to a fifth aspect of the present invention is the apparatus according to anyone of the first through fourth aspects wherein the voltage detection unit is included in the power source controller.

In this case, the configuration of the power source detection unit is simplified because the power source voltage detector is included in the power source controller.

The bicycle electric power unit relating to a sixth aspect of the present invention is the apparatus according to anyone of the first through fifth aspects wherein the power source is a secondary battery capable of charging and discharging.

In this case, over discharging of the secondary battery is prevented and deterioration of the secondary battery is also prevented when a secondary battery is used.

The bicycle electric power unit relating to a seventh aspect of the present invention is the apparatus according to anyone of the first through fifth aspects wherein electric power is supplied to the power source from an alternating-current electric generator that generates electricity in accordance with the rotation of the bicycle wheels. The apparatus further comprises a rectifying unit for rectifying the alternating current of the alternating-current electric generator to a direct current and charging the power source.

In this case, the power source is charged while the bicycle is moving because the power source is charged by the electric power that has been obtained by rectifying the electric power of the alternating-current electric generator to a direct current.

The bicycle electric power unit relating to an eighth aspect of the present invention is the apparatus according to anyone of the first through seven aspects, further comprising a speed signal generator for generating a speed signal corresponding to the speed of the bicycle, wherein the power source controller controls the first power source switch to turn off when the bicycle is determined to have been stopped for a specific time or more on the basis of an output from the speed signal generator. In this case, it is possible to prevent unnecessary consumption of electric power from the power source when the bicycle has stopped for a specific time of 15 minutes or more, for example.

The bicycle electric power unit relating to a ninth aspect of the present invention is the apparatus according to the eighth aspect wherein the speed signal generator generates the speed signal on the basis of electric power from the alternating-current electric generator.

In this case, speed signals are generated without providing a speed detection device because the speed signals are generated from electric power with a frequency that corresponds to the speed output from the alternating-current electric generator.

The bicycle electric power unit relating to a tenth aspect of the present invention is an apparatus including a power source, a power source controller, a first power source switch and a second power source switch. The power source controller is configured to turn the power source on or off. The first power source switch is connected to an operating switch. The first power source switch supplies electric power to the power source controller when the power source is on and blocks the supply of electric power to the power source controller when the power source is off. The first power source switch is turned on by the operating switch when the power source is off. The second power source switch is coupled to the power source and controllably turned on or off by the power source controller. The power source controller turns the second power source switch on when the electric power is supplied from the first power source switch.

In this electric power unit, if the operating switch is turned on when the first power source switch is off and the power source controller has stopped, the first power source switch is turned on. As a result, electric power from the power source is supplied to the power source controller, and the power source controller initiates operation and turns the second power source switch on. Since the configuration is designed so that the first power source switch is turned on by the hardware used in the operation of the operating switch, which is an electrical component, electric power is supplied to the power source controller, and the second power source switch is turned on to supply electric power to the electrical components merely by turning the often-used operating switch on. Therefore, even if the power source controller is stopped in order to reduce consumption by the power source, the power source controller is restarted to supply electric power to the electrical components without providing a special switch for turning the power source on and off. Also, even if the first power source switch is turned off due to erroneous operations or the like while the bicycle is moving, the switch is automatically turned on by turning the operating switch on. Electric power is supplied to the power source controller and the electrical components. Therefore, the control unit for controlling the power source is restarted with a simple operation when the control unit has stopped.

The bicycle electric power unit relating to an eleventh aspect of the present invention is the apparatus according to any of the second through tenth aspects, further comprising a switch monitoring unit for monitoring the state of the operating switch, wherein the power source controller controls the first power source switch to turn off when the operating switch has not operated for a specific time or greater. In this case, consumption by the power source is minimized because the power source controller stops when the operating switch has not operated for a specific time of fifteen minutes or more, for example, due to the bicycle having stopped or other such reasons.

According to the present invention, electric power is no longer supplied to the power source controller when the power source voltage falls to a specific value or less. Therefore, electric power is no longer consumed by the power source controller operating in power conservation mode. Therefore, deterioration of the power source due to eddy over discharge is effectively suppressed.

According to the present invention, the configuration is designed so that the first power source switch is turned on by hardware used in the operation of the operating switch, which is an electrical component. Therefore, electric power is supplied to the power source controller, and the second power source switch is turned on to supply electric power to the electrical components merely by turning the often-used operating switch on. Accordingly, even if the power source controller is stopped in order to reduce consumption by the power source, the power source controller is restarted and made to supply electric power to the electrical components without providing a special switch for turning the power source on and off. Also, even if the first power source switch is turned off due to erroneous operations or the like while the bicycle is moving, the switch is automatically turned on by turning the operating switch on. Electric power is supplied to the power source controller and the electrical components. Therefore, the control unit for controlling the power source is restarted with a simple operation when the control unit has stopped.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A selected embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
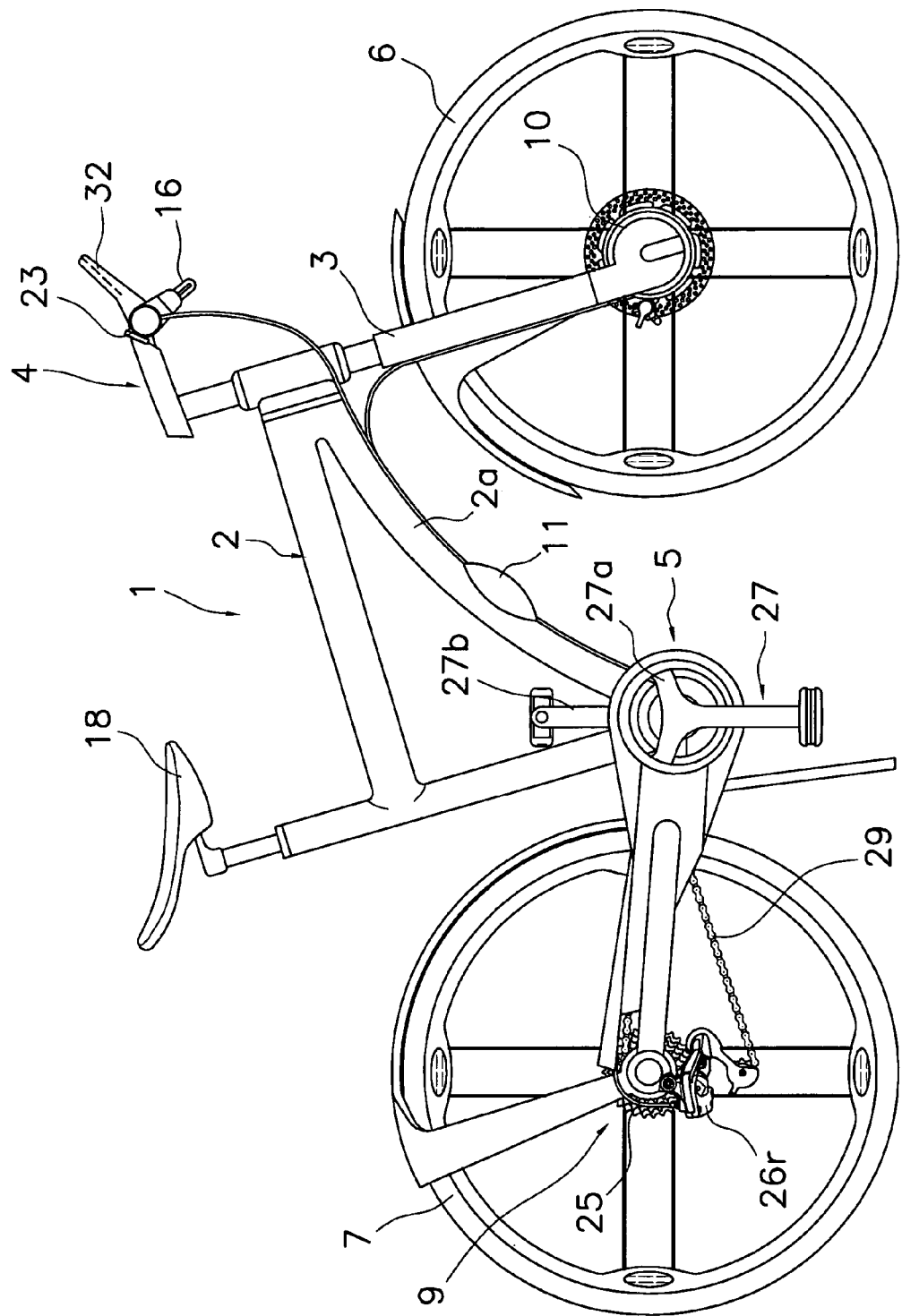
FIG. 1 is a side elevational view of a bicycle equipped with a bicycle electric power unit in accordance with one embodiment of the present invention.

Referring initially to FIG. 1, a bicycle is illustrated in accordance with a preferred embodiment of the present invention. The bicycle is a front-suspension bicycle that basically includes a frame 1 with a diamond-style frame body 2, a front suspension fork 3, a handle unit 4, a drive unit 5, a front wheel 6 and a rear wheel 7. The drive unit 5 includes a rear gear shifter 9 that is powered by a hub dynamo 10 via an electric power unit 11. In particular, the electric power unit 11 supplies electric power to the rear gear shifter 9. The front wheel 6 is mounted on the front fork 3. The rear gear shifter 9 includes a rear derailleur 26r. The front wheel 6 has the hub dynamo 10 mounted thereon.

The frame body 2 of the frame 1 is made by welding pipes. The frame body 2 includes a down tube 2a. The frame body 2 supports a plurality of bicycle components of the bicycle 1 including a saddle 18 and the drive unit 5, which are mounted on the frame body 2. The front fork 3 is pivotally mounted to a front of the frame body 2 around an inclined axle.

Figure 2:
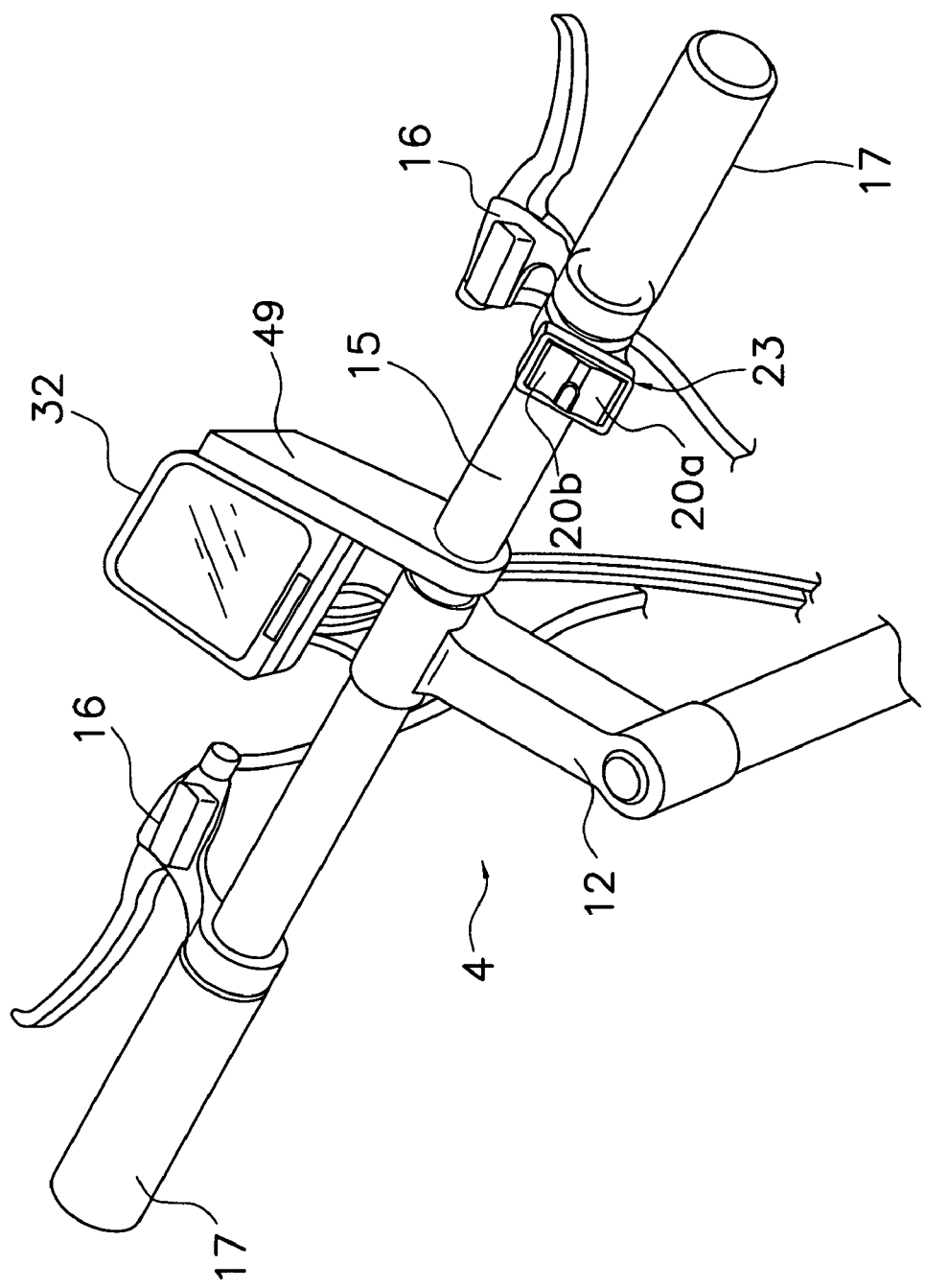
FIG. 2 is an enlarged perspective view of a handle unit of the bicycle illustrated in FIG. 1 in accordance with the present invention.

Referring to FIG. 2, the handle unit 4 has a handle stem 12 and a handlebar 15. The handle bar 15 is fixed to the handle stem 12. The handle stem 12 is fixed to a top of the front fork 3. The handlebar 15 has right and left end portions. Each end portion of the handlebar 15 has a brake lever 16 and a grip 17 mounted thereto. A switch unit 23 is mounted on an inner side of the right end portion of the handlebar 15.

The switch unit 23 has first and second operating switches 20a and 20b. The first and second operating switches 20a and 20b are for manually shifting gears with the rear gear shifter 9. The first operating switch 20a is a switch for down-shifting the rear derailleur 26r one gear at a time. The second operating switch 20b is a switch for up-shifting the rear derailleur 26r one gear at a time. The first and second operating switches 20a and 20b are manually-operated/ automatic-return contact points. The contact points close only when one of the first and second switches 20a and 20b are pushed.

In addition, a bracket 49 is mounted in a center of the handle unit 4. A display unit or cycle computer 32 is mounted on the bracket 49. The display unit 32 is configured and arranged for displaying the speed of the bicycle 1, the distance traveled and/or other such information to the rider.

Referring to FIG. 1, the drive unit 5 further includes a crank 27 and a chain 29. The crank 27 is located at a bottom of the frame body 2. The rear derailleur 26r is mounted at a back of the frame body 2. The rear gear shifter 9 has a multi-speed gear 25 with eight sprockets (not all shown), for example. The crank 27 has a gear crank 27a and a left crank 27b. A plurality of sprockets (not shown) is mounted on the gear crank 27a. The chain 29 runs over a selected sprocket of the sprockets of the gear crank 27a and the multi-speed gear 25. The number of teeth in the sprockets of the multi-speed gear 25 decreases sequentially from a sprocket with the most teeth. The sprocket with the least number of teeth is disposed on an outermost side. The number of sprockets is not accurately depicted in FIG. 1 for the sake of simplicity.

The rear derailleur 26r is an electrically operated derailleur. The rear derailleur 26r has an electrical component or motor unit 30 mounted in an interior of the rear derailleur 26r. The motor unit 30 includes a microcomputer for controlling shifting operations that are signaled by the first and second operating switches 20a and 20b. Thus, the rear derailleur 26r is down-shifted and up-shifted by operation of the first and second operating switches 20a and 20b. The first and second operating switches 20a and 20b are connected to the rear derailleur 26r via the electric power unit 11.

The hub dynamo 10 of the front wheel 6 is a hub capable of mounting a brake disc of a disc brake. The hub dynamo 10 has an alternating-current electric generator 19 in an interior that generates electricity according to rotation of the front wheel 6.

The electric power unit 11 is mounted on a middle portion of the down tube 2a of the frame body 2, as shown in FIG. 1. The electric power unit 11 rectifies and stores electricity from the alternating-current electric generator 19 of the hub dynamo 10. The electric power unit 11 supplies the electricity to the rear derailleur 26r.

Figure 3:
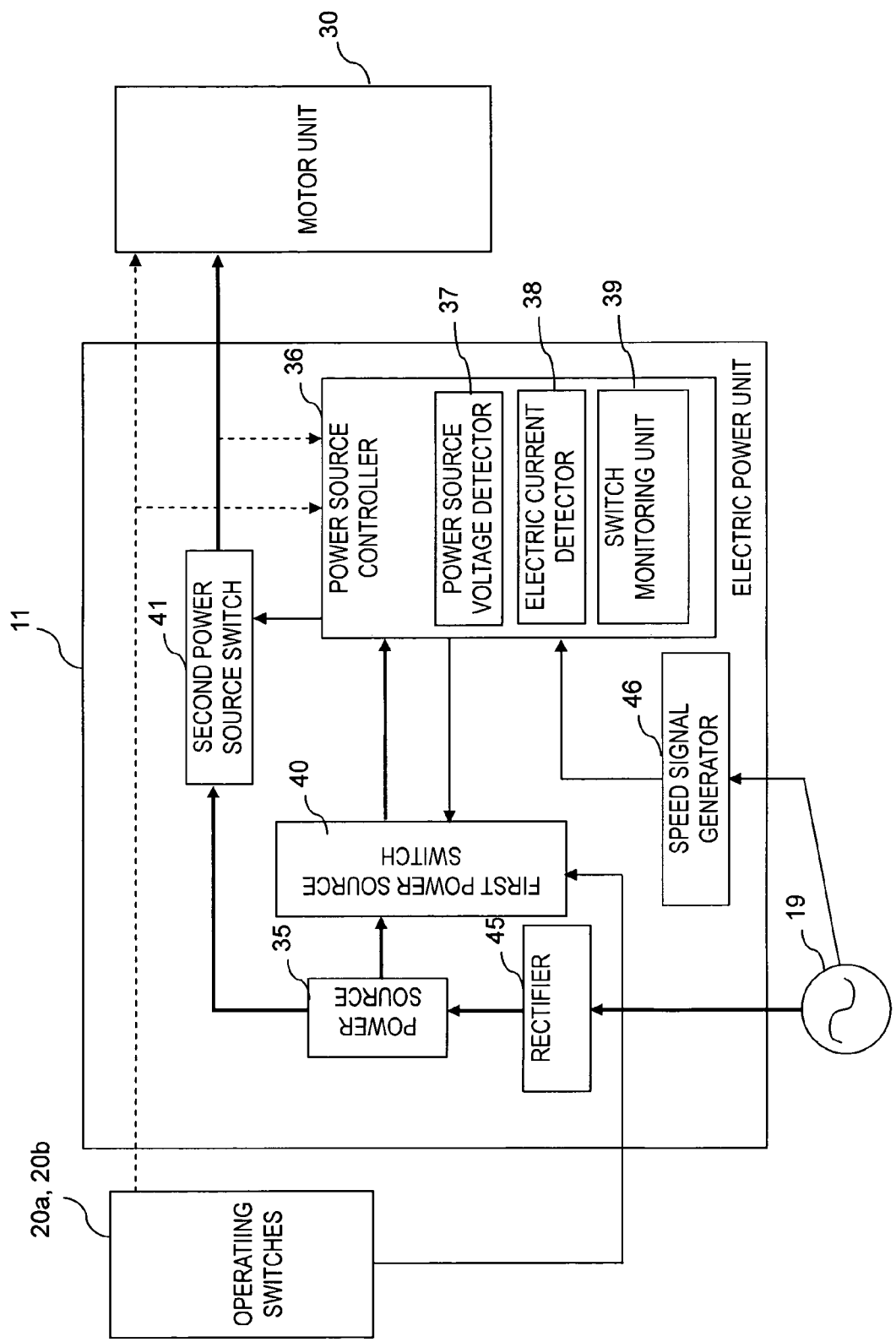
FIG. 3 is a block diagram showing the functional configuration of the bicycle electric power unit of the bicycle illustrated in FIG. 1 in accordance with an the present invention.

Referring to FIG. 3, the electric power unit 11 includes a power source 35, a power source controller 36, a power source voltage detector 37, an electric current detector 38, a switch monitoring unit 39, a first power source switch 40 and a second power source switch 41.

The power source controller 36 can also include other conventional components such as an input interface circuit, an output interface circuit, and storage devices such as a ROM (Read Only Memory) device and a RAM (Random Access Memory) device. The memory circuit stores processing results and control programs. The internal RAM stores statuses of operational flags and various control data. The internal ROM stores the software for various operations. The power source controller 36 is capable of selectively controlling any of the components of the electric power unit 11 in accordance with the control program. It will be apparent to those skilled in the art from this disclosure that the precise structure and algorithms for the power source controller 36 can be any combination of hardware and software that will carry out the functions of the present invention.

The power source controller 36 controls the turning on and off of the power source 35. The power source voltage detector 37 detects a voltage of the power source 35. The electric current detector 38 detects an electric current value of electric power supplied to the rear derailleur 26r. The switch monitoring unit 39 monitors a state of the first and second operating switches 20a and 20b. The first power source switch 40 is connected to the first and second operating switches 20a and 20b and the power source 35. The first power source switch 40 is used for supplying electric power to the power source controller 36. The second power source switch 41 is disposed between the power source 35 and the motor unit 30. The second power source switch 41 turns electric power that is supplied to the motor unit 30 on and off.

The second power source switch 41 is provided separately from the power source controller 36. It will be apparent to one of skill in the art from this disclosure that the second power source switch 41 can be provided in the interior of the power source controller 36, depending on the capacity or design of the power source controller 36.

The electric power unit 11 further includes a rectifier 45 and a speed signal generator 46. The rectifier 45 is supplied with electric power from the alternating-current electric generator 19. The rectifier 45 is used to rectify the electric power from the generator 19 to a direct current and to charge the power source 35. Specifically, the rectifier 45 subjects the electric power of the alternating current from the alternating-current electric generator 19 to, for example, half-wave rectification and converts the electric power to a direct current. The speed signal generator 46 generates a speed signal corresponding to a speed of the bicycle 1 on the basis of a pulse output of the alternating current from the alternating-current electric generator 19. Specifically, the speed signal generator 46 shapes the waveform of the pulse output that corresponds to the bicycle speed output from the alternating-current electric generator 19 with a Schmitt trigger circuit, for example, and generates a speed signal.

The power source 35 is a nickel cadmium battery, a lithium ion battery or another such rechargeable secondary battery, for example. For example, 12-V electric power that has been rectified by the rectifier 45 is stored in the power source 35. The power source controller 36 has an 8-bit microcomputer, for example. The power source voltage detector 37, the electric current detector 38 and the switch monitoring unit 39 are internally disposed at the power source controller 36. It will be apparent to one of skill in the art from this disclosure that the power source voltage detector 37 or the electric current detector 38 or the like can be provided exteriorly of the power source controller 36. It will also be apparent to one of skill in the art from this disclosure that the power source 35 can be an electric double-layer capacitor or another such high-capacity capacitor, a dry battery or another such primary battery. If a primary battery is used, a power source mounting unit capable of mounting the primary battery as a power source can be used.

The first power source switch 40 is disposed between the power source 35 and the power source controller 36. The first power source switch 40 is connected to both the power source 35 and the power source controller 36. The first power source switch 40 is used to turn a connection between the power source 35 and the power source controller 36 on and off. The first power source switch 40 supplies electric power to the power source controller 36 in the on position. The first power source switch 40 blocks the supply of electric power to the power source controller in the off position. The first power source switch 40 is turned off by the power source controller 36 when in the on position. Also, the first power source switch 40 is connected to the first and second operating switches 20a and 20b. The first power source switch 40 is turned on by an on operation of either of the first and second operating switches 20a and 20b when in an off position. The second power source switch 41 is controllably turned on and off by the power source controller 36.

Figure 4:
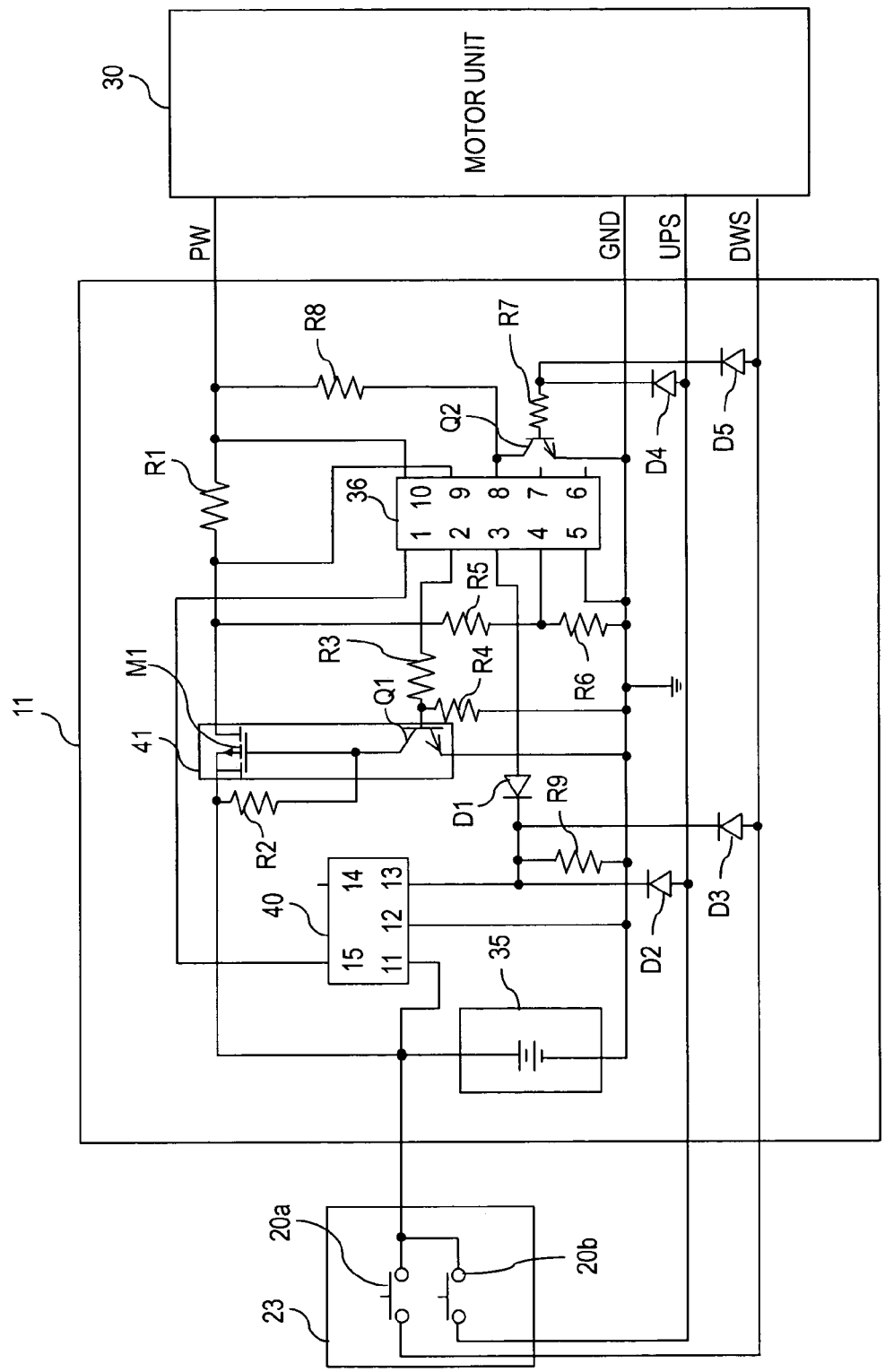
FIG. 4 is a circuit diagram showing a configuration of the bicycle electric power unit as diagramed in FIG. 4 in accordance with the present invention.

Referring to FIG. 4, the general circuit configuration of the electric power unit 11 will now be described. In FIG. 4, circuit configurations of the rectifier 45 and the speed signal generator 46 are omitted. The power source 35 has a plurality of positive electrodes that is connected to the motor unit 30 via a power source wire PW. The positive electrodes are connected to an end of the first and second operating switches 20a and 20b. The power source 35 has a plurality of negative electrodes that is connected to the motor unit 30 via a ground wire GND. The motor unit 30 is separately connected to other ends of the first and second operating switches 20a and 20b via a down-shift signal wire DWS and an up-shift signal wire UPS.

The microcomputer of the power source controller 36 has first thorough tenth terminals, for example. The first terminal is an electric input terminal. A voltage from the power source 35 is input to the first terminal. The first terminal is connected to the first power source switch 40. For example, 3.6-V electric power is supplied to the power source controller 36 from the first power source switch 40. The second terminal is a first signal output terminal that outputs an on-off control signal to control the turning on and off of the second power source switch 41. The second terminal is connected to a base of a first transistor Q1 via a third resistor R3. The base of the first transistor Q1 is connected to the ground wire GND via a fourth resistor R4.

The third terminal is a second signal output terminal that outputs an on-off signal to control the turning on and off of the first power source switch 40. The third terminal is connected to an anode terminal of a first diode D1. The fourth terminal is a voltage input terminal for detecting the voltage of the power source 35. The fourth terminal is connected to an intermediate node between fifth and sixth resistors R5 and R6. The fifth and sixth resistors R5 and R6 are connected in series between the power source wire PW and the ground wire GND. The eighth terminal is a signal input terminal for monitoring the first and second operating switches 20a and 20b. The eighth connection terminal is connected to a collector of an npn-type second transistor Q2. The collector of the second transistor Q2 is connected to the power source wire PW via an eighth resistor R8 on a side nearest the motor unit 30, thereby connecting to a field-effect transistor M1. An emitter of the second transistor Q2 is connected to the ground wire GND. A base of the second transistor Q2 is connected via a seventh resistor R7 to fourth and fifth diodes D4 and D5. An anode of the fourth diode D4 is connected to the up-shift signal wire UPS. An anode of the fifth diode D5 is connected to the down-shift signal wire DWS.

The ninth and tenth terminals are electric current input terminals for determining the electric current value flowing to the motor unit 30. The ninth and tenth terminals are each connected to an end of a first resistor R1. The first resistor R1 is disposed on the power source wire PW between the field-effect transistor M1 and the motor unit 30.

The first power source switch 40 is, for example, a regulator having eleventh though fifteenth terminals which adjust 12-V voltage to the operating voltage (for example, 3.6 V) for the power source controller 36 and outputs the resulting voltage. The eleventh terminal is a power input terminal to which the electric power of the power source 35 is input. The eleventh terminal is connected to the power source 35 and to the first and second operating switches 20a and 20b. The twelfth terminal is connected to the ground wire GND. The thirteenth terminal is a chip select terminal for switching the first power source switch 40 from on to off. The first power source switch 40 is turned on when, for example, the thirteenth terminal has a high voltage and is turned off when the thirteenth terminal has a low voltage. The thirteenth terminal is connected to the cathode of the first diode D1. The thirteenth terminal is also connected to the up-shift signal wire UPS and the down-shift signal wire DWS via second and third diodes D2 and D3. An anode of the second diode D2 is connected to the up-shift signal wire UPS. An anode of the third diode D3 is connected to the down-shift signal wire DWS. An on-off signal is thereby input to the thirteenth terminal from the power source controller 36. When either of the first and second operating switches 20a and 20b is turned on, an on signal is input. The cathode of the first diode D1 is also connected to the ground wire GND via a ninth resistor R9. The fourteenth terminal is not used. The fifteenth terminal is an electric output terminal that outputs electricity to the power source controller 36. The fifteenth terminal is connected to the first terminal of the power source controller 36.

The second power source switch 41 has the npn-type first transistor Q1 and the field-effect transistor (FET) M1. The first transistor Q1 is disposed between the power source wire PW and the ground wire GND. The field-effect transistor M1 is disposed in a middle of the power source wire PW. The field-effect transistor M1 is used for turning the power source wire PW on and off. The collector of the first transistor Q1 is connected to a gate of the field-effect transistor M1. An emitter is connected to the ground wire GND. Also, the collector of the first transistor Q1 is connected to the power source wire PW via a second resistor R2. A source of the field-effect transistor M1 is connected to a power source wire side of the power source 35. A drain of the field-effect transistor M1 is connected to a power source wire side of the motor unit 30. The base of the first transistor Q1 is thereby provided with a high voltage when an on signal is output to the base of the first transistor Q1 from the power source controller 36. The first transistor Q1 is turned on to allow an electric current to flow to a gate of the field-effect transistor M1. The field-effect transistor M1 is turned on to allow electric power to be supplied to the motor unit 30. Also, when the power source controller 36 is turned off, the base is provided with a low voltage and the electric current to the gate is blocked. The field-effect transistor M1 is thereby turned off, and the supply of electric power to the motor unit 30 is blocked.

The second power source switch 41 is turned off by blocking a supply of electric power to the power source controller 36, but after an off signal is output to turn the second power source switch 41 off, an off signal can be output to the first power source switch 40. In this case, after a low off signal is output from the second terminal to the first transistor Q1, a low off signal can be output from the third terminal to the thirteenth terminal of the first power source switch 40 with asynchronous timing.

Next, an example of the operation of the first and second operating switches 20a and 20b and a control operation of the power source controller 36 will be described.

If either of the first and second operating switches 20a and 20b is operated when the first power source switch 40 is off, then an electric current flows from the power source 35 to the thirteenth terminal of the first power source switch 40 via either of the second operating switch 20b and the second diode D2 or the first operating switch 20a and the third diode D3. The thirteenth terminal then acquires a high voltage. The first power source switch 40 is thereby turned on. The electric power supplied to the eleventh terminal is supplied to the first terminal of the power source controller 36 from the fifteenth terminal.

It will be apparent to one of skill in the art from this disclosure that the circuit configuration shown in FIG. 4 is just one example of the electric power unit 11 and various other modifications are possible for the circuit configuration. For example, if the first power source switch 40 is controllably turned on and off by the power source controller 36 and is turned on by the first and second operating switches 20a and 20b, then it is not limited to a regulator, and can also be configured from a mechanical relay, a transistor or a field-effect transistor.

Figure 5:
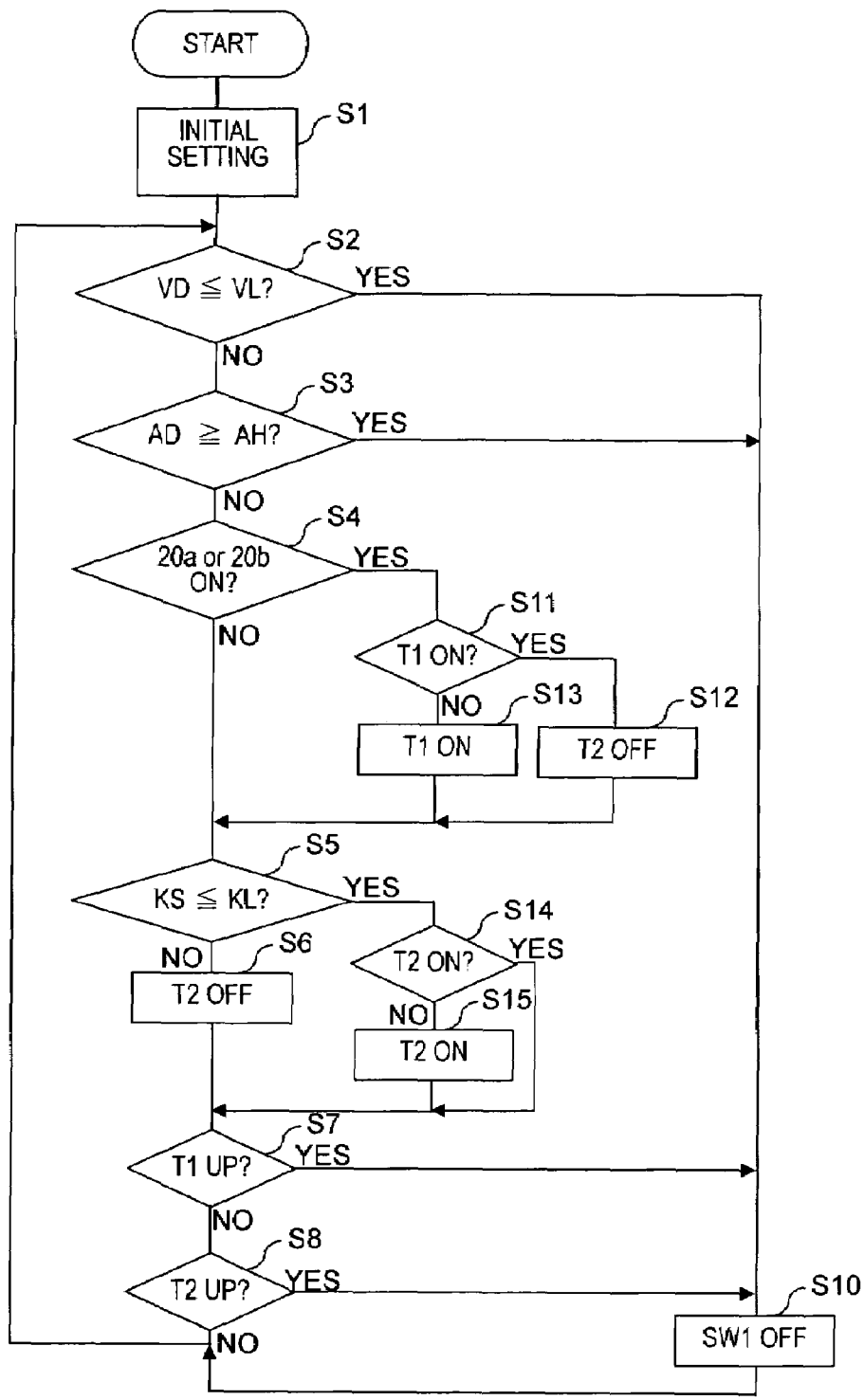
FIG. 5 is a flowchart showing a control operation of the bicycle electric power unit illustrated in FIGS. 3 and 4 in accordance with the present invention.

Referring to FIG. 5, when electric power is supplied to the power source controller 36, the power source controller 36 performs an initial setting in step S1. In this initial setting, various data and timers are initialized. A high on signal for turning on the second power source switch 41 is output from the second terminal. A high on signal for turning on the first power source switch 40 is output from the third terminal. When an on signal is output from the second terminal, the signal is input to the first transistor Q1. The gate of the field-effect transistor M1 acquires a high voltage. The field-effect transistor M1 is turned on and electric power is supplied to the motor unit 30. Also, the on signal is output from the third terminal of the power source controller 36 through the first diode D1 to the thirteenth terminal of the first power source switch 40. The thirteenth terminal acquires a high voltage due to the on signal. The first power source switch 40 is kept on until an off signal is sent from the third terminal of the power source controller 36.

In step S2, the power source controller 36 is configured to determine, based on the input to the fourth terminal, whether a power source voltage VD has decreased to less than a minimum guaranteed voltage VL (for example, 3 V), which is the lowest voltage before the power source 35 over discharges and loses functionality. It is thereby determined whether the power source 35 has reached a low voltage due to over discharging.

In a third step S3, the power source controller 36 is configured to determine, based on the input to the ninth and tenth terminals, whether an electric current value AD supplied to the motor unit 30 is equal to or greater than a maximum allowable electric current AH (for example, 5 ampere) of the motor unit 30. It is thereby determined whether an overcurrent is flowing to the motor unit 30 when problems occur with the rear derailleur 26r due to the chain 29 catching or other such reasons.

In step S4, the power source controller 36 is configured to determine, based on the input to the eighth terminal, whether the first and second operating switches 20a and 20b have been turned on. If either of the first and second operating switches 20a and 20b has been turned on, the base of the second transistor Q2 acquires a high voltage via the seventh resistor R7 and the fourth and fifth diodes D4 and D5. The eighth terminal thereby acquires a high voltage.

In step S5, the power source controller 36 is configured to determine, based on the speed signal from the speed signal generator 46, whether a speed KS is equal to or less than a specific speed KL (for example, 2 km per hour). It is thereby determined whether the bicycle 1 has stopped. Though not shown, the signal from the speed signal generator 46 can be input to the sixth or seventh terminal, neither of which is connected to any device in FIG. 4. When the speed KS exceeds the specific speed KL, the process advances to step S6.

In step S6, a second timer T2 is turned off. The second timer T2 begins counting when a speed equal to or less than the specific speed KL lasts for fifteen minutes or more, for example. The power source controller 36 is configured to determine whether the bicycle 1 has been parked for fifteen minutes or more. In step S6, if the speed even slightly exceeds the specific speed KL, the second timer T2 is immediately stopped.

In step S7, the power source controller 36 is configured to determine whether a first timer T1 has began counting. This first timer T1 begins counting when the first and second operating switches 20a and 20b have not been operated for a specific time (for example, fifteen minutes).

In step S8, the power source controller 36 is configured to determine whether the second timer T2 has began counting.

The process advances from step S2 to step S10 if the power source voltage VD is less than the minimum guaranteed voltage VL. In step S10, an off signal is output from the third terminal to the first power source switch 40. Specifically, the signal output from the third terminal is low. The first power source switch 40 is thereby turned off. The supply of electric power from the fifteenth terminal to the power source controller 36 is blocked. The power source controller 36 is turned off. As a result, the first transistor Q1 and the field-effect transistor M1 are also turned off and the supply of electric power to the motor unit 30 is blocked. The electric power consumed at this time barely reaches an electric current of about 1 μA, which is the current that flows to the first power source switch 40, and reaches a markedly smaller electric current value AD than an electric current value during a power conservation mode of the microcomputer. Therefore, when the power source voltage VD has decreased, further decrease in the power source voltage VD is prevented. Accordingly, deterioration in the power source 35 due to over discharging is effectively suppressed.

When the electric current value AD to the motor unit 30 reaches the maximum allowable electric current value AH or greater, the process advances from the third step S3 to step S10. The supply of electric power to the power source controller 36 and to the motor unit 30 is blocked by the same operation as previously described.

When the first and second operating switches 20a and 20b are turned on, the process advances from step S4 to step S11. In step S11, the power source controller 36 is configured to determine whether the first timer T1 has already been turned on (whether or not it has started). If the first timer T1 has already started, the process advances to step S12 and the timer T1 is turned off. In this case, one of the first and second operating switches 20a and 20b is operated within a specific time (for example, 15 minutes) as a result. If the first timer T1 has not started, the process advances from step S11 to step S13, and the first timer T1 is turned on and started. When these steps have ended, the process advances to step S5.

When the speed KS is equal to or less than the specific speed KL, the process advances from step S5 to step S14. In step S14, the power source controller 36 is configured to determine whether the second timer T2 has already been turned on (whether or not it has started). If the second timer T2 has already started, the process advances to step S7 without going through any other steps. If the second timer T2 has not started, the process advances from step S14 to step S15, the second timer T2 is turned on and started, and the process advances to step S7.

If the power source controller 36 determines in step S7 or S8 that the timer T1 or the timer T2 has begun counting, the process advances to step S10. The supply of electric power to the power source controller 36 and the motor unit 30 is blocked by the same operation as previously described.

The supply of electric power to the power source controller 36 is blocked not only when the power source voltage VD decreases, but also when there is an overcurrent, when the first and second operating switches 20a and 20b have not been operated for a specific time (for example, fifteen minutes) or more, or when the bicycle 1 has stopped for a specific time (for example, fifteen minutes) or more. Therefore, not only are problems due to over discharging of the power source 35 resolved, but overcurrent-induced damage to the motor unit 30 or the field-effect transistor M1 is also prevented. Unnecessary consumption of the electric power of the power source 35 is further suppressed.

Since the configuration is designed so that the first power source switch 40 is turned on by an on operation of either of the first and second operating switches 20a and 20b, electric power is supplied to the power source controller 36. The second power source switch 41 is turned on to supply electric power to the motor unit 30 merely by turning on the first and second operating switches 20a and 20b used in the regular gear-shifting operation. Therefore, even if the power source controller 36 has been stopped in order to reduce consumption by the power source 35, the power source controller 36 is restarted and made to supply electric power to the electrical components without providing a special switch for turning the power source 35 on and off. Also, even if the first power source switch 40 is turned off due to erroneous operations or the like while the bicycle 1 is moving, the first power source switch 40 is automatically turned on by turning the first and second operating switches 20a and 20b on. The electric power is supplied to the power source controller 36 and the motor unit 30. Therefore, the power source controller 36 is restarted with a simple operation when the power source controller 36 has stopped.

The electric power unit 11 was described as supplying electric power to the motor unit 30 of the rear derailleur 26r. However, it will be apparent to one of skill in the art from this disclosure that the electric power unit 11 can be any apparatus that supplies electric power to the front derailleur (not shown) to the motor unit 30 of an auxiliary drive apparatus for assisting the drive force, or to any other such electrical components installed on the bicycle 1.

The power conservation mode was not described in detail herein. However, the above disclosed system can, for example, go into the power conservation mode in a time equal to or less than a specific time. The supply of electric power to the power source controller 36 can be blocked when another specific time or more has passed. These two specific times are one example, and the specific times can be set to appropriate levels depending on the capacity of the power source 35 the capacity of the motor unit 30, the minimum guaranteed voltage of the power source 35 and/or other such factors.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents. Thus, the scope of the invention is not limited to the disclosed embodiment.

What is claimed is:

1. A bicycle electric power unit comprising:
a power source;
a power source controller configured to turn the power source on or off;
a power source voltage detector configured to detect a voltage of the power source;
a first power source switch configured to selectively supply electric power to the power source controller; and
an operating switch operatively connected to the first power source switch, the operating switch configured to turn the first power source switch on by turning on the operating switch, the power source controller being configured to turn the first power source switch off when the power source voltage detector detects a voltage of the power source being at a predetermined value or less.

2. The bicycle electric power unit according to claim 1, wherein
the operating switch is configured to selectively operate the first power source switch.

3. The bicycle electric power unit according to claim 2, wherein
the power source controller is configured to selectively operate the first power source switch to turn off upon detecting that the operating switch has not been operated for a predetermined time or greater.

4. The bicycle electric power unit according to claim 1, further comprising
an electric current detector configured to detect an electric current value of the electric power, with the power source controller being configured to selectively turn the first power source switch off when the electric current detector detects the electric current value is equal to or greater than a predetermined value.

5. The bicycle electric power unit according to claim 4, wherein
the electric current detector is integrated into the power source controller as a single unit.

6. The bicycle electric power unit according to claim 1, wherein
the power source voltage detector is integrated into the power source controller as a single unit.

7. The bicycle electric power unit according to claim 1, wherein
the power source includes a rechargeable battery that is configured to be charged and discharged.

8. The bicycle electric power unit according to claim 7, wherein
the power source includes an alternating-current generator configured to generate electricity and supply the electricity to the rechargeable battery.

9. The bicycle electric power unit according to claim 8, further comprising
a rectifying unit configured to rectify an alternating current of the alternating-current generator to a direct current and to charge the power source.

10. The bicycle electric power unit according to claim 1, wherein
the power source includes an alternating-current generator configured to generate electricity.

11. The bicycle electric power unit according to claim 1, further comprising
a speed signal generator configured to generate a speed signal, with the power source controller being configured to control the first power source switch to turn on based on an output from the speed signal generator.

12. The bicycle electric power unit according to claim 11, wherein
the speed signal generator is configured to generate the speed signal based on electric power from the alternating-current generator.

13. A bicycle electric power unit comprising:
a power source;
a power source controller configured to turn the power source on or off;
a power source voltage detector configured to detect a voltage of the power source;
a first power source switch configured to selectively supply electric power to the power source controller, the first power source switch operatively connected to an operating switch, that is configured to selectively operate the first power source switch; and
a second power source switch operatively coupled to the power source and operatively controlled by the power source controller to be selectively turned on in response to electric power being supplied to the power source controller through the first power source switch,
the power source controller being configured to turn the first power source switch off when the power source voltage detector detects a voltage of the power source being at a predetermined value or less.

14. The bicycle electric power unit according to claim 13, further comprising
a switch monitoring unit configured to monitor an operating state of the operating switch, the power source controller being configured to selectively operate the first power source switch to turn off upon detecting that the operating switch has not been operated for a predetermined time or greater.

15. A bicycle electric power unit comprising:
a power source;
a power source controller configured to turn the power source on or off;
a first power source switch configured to selectively supply electric power to the power source controller;
an operating switch operatively connected to the first power source switch and the power source controller such that the first power source switch is turned on by turning on the operating switch; and
a second power source switch operatively coupled to the power source and operatively controlled to be selectively turned on by the power source controller when the electric power is supplied from the power source to the power source controller through the first power source switch.

16. The bicycle electric power unit according to claim 15, further comprising
a switch monitoring unit configured to monitor an operating state of the operating switch, with the power source controller being configured to control the first power source switch to turn off when the operating switch has not operated for a predetermined time or greater.

17. The bicycle electric power unit according to claim 15, further comprising
an electric current detector configured to detect an electric current value of the electric power, with the power source controller being configured to selectively turn the first power source switch off when the electric current detector detects the electric current value is equal to or greater than a predetermined value.

18. The bicycle electric power unit according to claim 15, wherein
the power source includes a rechargeable battery that is configured to be charged and discharged.

19. The bicycle electric power unit according to claim 18, wherein
the power source includes an alternating-current generator configured to generate electricity and supply the electricity to the rechargeable battery.

20. The bicycle electric power unit according to claim 15, wherein
the power source includes an alternating-current generator configured to generate electricity.

* * * * *